United States Patent [19]
Kimura

[11] Patent Number: 6,102,708
[45] Date of Patent: Aug. 15, 2000

[54] CARD CONNECTOR HAVING A SHIELD PLATE OF ALUMINUM ALLOY

[75] Inventor: Akira Kimura, Kokubunji, Japan

[73] Assignee: Japan Aviation Electronics Industry, Limited, Tokyo, Japan

[21] Appl. No.: 09/168,657

[22] Filed: Oct. 8, 1998

[30] Foreign Application Priority Data

Oct. 8, 1997 [JP] Japan ................................ 9-276210

[51] Int. Cl.[7] .................................................... H01R 9/09
[52] U.S. Cl. ............................ 439/64; 439/157; 439/159
[58] Field of Search ............................ 439/64, 377, 157, 439/160, 327, 328; 361/801, 740, 759, 747, 756, 802

[56] References Cited

U.S. PATENT DOCUMENTS

| | | | |
|---|---|---|---|
| 4,810,200 | 3/1989 | Sakamoto | 439/155 |
| 5,421,737 | 6/1995 | Chen et al. | 439/157 |
| 5,456,610 | 10/1995 | Banakis et al. | 439/157 |
| 5,533,906 | 7/1996 | Abe | 439/159 |
| 5,673,182 | 9/1997 | Garner | 361/829 |

*Primary Examiner*—Renee Luebke
*Assistant Examiner*—J. F. Duverne
*Attorney, Agent, or Firm*—Laff, Whitesel & Saret, Ltd.; J. Warren Whitesel

[57] ABSTRACT

A card connector 1 comprises a generally U-shaped insulator body 11, 12 having contacts 21, 22 and metallic shield plates 81, 91 mounted on upper and lower surfaces of the insulator body 1. A card receiving slot is located between two arms of the U-shaped insulator body 11, 12. The aluminum construction with ventilation holes 85, 95 and heat dissipating fins 86, have a reduced weight. The card connector 1 protects the card 200 from heat produced by card itself. Further, eject bars 51, 52 of the card connector 1 are held by an eject bar hold portion 13a, 15a which is formed by molding plastic resin together with the insulator body 11, 12.

6 Claims, 5 Drawing Sheets

CARD CONNECTOR HAVING A SHIELD PLATE OF ALUMINUM ALLOY

BACKGROUND OF THE INVENTION

This invention relates to a card connector to be used in a personal computer or the like for connecting and disconnecting a card to the personal computer. Here, the card generally refers to a memory card such as personal computer (PC) card or the like.

A conventional card connector has an insulator body supporting contact elements. The insulator body has two arms frontward extending in parallel with each other to form a space therebetween. The card connector further has two shield plates of stainless steel fixed to the insulator body to cover the space, so that a card receiving slot is provided. The shield plates define an upper wall and a lower wall of the card receiving slot. The shield plates have outer sides extending onto outer side surfaces of the arms. The shield plates are for protecting the card in the card receiving slot from ambient electromagnetic noise or the electromagnetic interference (EMI).

The card connector further has an ejector also mounted thereon for ejecting the card loaded in the connector. The ejector includes a metallic eject bar which is mounted on one of the outer sides of the shield plates to be slidable in frontward and rearward, an eject button fixed to a front end of the eject bar, and a lever mechanism linked to a rear end of the eject bar and mounted on the insulator body to frontward push out the card from the connector body when the eject bar is pushed rearward through the eject button.

In the conventional card connector, the metallic eject bar is held by the outer side of the metallic shield plate. Therefore, those metallic parts slide relative to each other in such a condition that they are in contact with each other, so that operation of the eject bar is accompanied with uncomfortable feeling.

Further, the shield plates made of stainless steel are heavy and therefore degrade portability of a personal computer having the conventional card connector. Further, the shield plates capture heat produced from the card operating in the card receiving slot. Therefore, the card may be destroyed by the heat.

SUMMARY OF THE INVENTION

Accordingly, it is an object of the present invention to provide a card connector with a reduced weight.

It is another object of the present invention to provide a card connector capable of effectively dissipating heat produced from the card operating.

It is a still another object of the present invention to provide a card connector capable of smoothly operating an eject bar without bad operating feeling.

According to the present invention, there is provided a card connector for receiving a card having a mating connector, which comprises an insulator body supporting contacts to be connected and disconnected with the mating connector, the insulator body having two arms frontward extending in parallel with each other to form a generally U-shape with a space left between the two arms; and two shield plates fixed to the insulator body and the arms to cover the space, the two shield plates defining upper and lower walls of a card receiving slot therebetween for receiving the card thereinto, the shield plates being made of aluminum alloy.

The shield plate preferably has ventilation holes and heat dissipating fins.

The card connector further comprises an ejector including an eject bar for ejecting the card in the card receiving slot, wherein a first one of the arms is provided with an eject bar holding portion for slidably holding the eject bar so that the eject bar can be slid along the first arm frontward and rearward.

The first arm is longer than the other one of the two arms as a second arm. Therefore, the first and the second arms preferably are provided with first and second guide grooves in inner side surfaces thereof, respectively, for receiving opposite sides of the card to guide frontward and rearward movement of the card in the card receiving slot. In the case, the second guide groove is shorter than the first guide groove, and the shield plates define a card guiding groove connecting with the second guide groove.

According to an embodiment, a card connector is of a double-slot structure, wherein the insulator body comprises two like pieces having the generally U-shape superposed on each other, and a separator made of aluminum alloy is disposed between the two pieces, the separator having ventilation holes.

DESCRIPTION OF THE PREFERRED EMBODIMENT

Prior to description of the preferred embodiment of this invention, a conventional card connector will be described with reference to FIG. 1 so as to facilitate better understanding of this invention.

Figure 1:
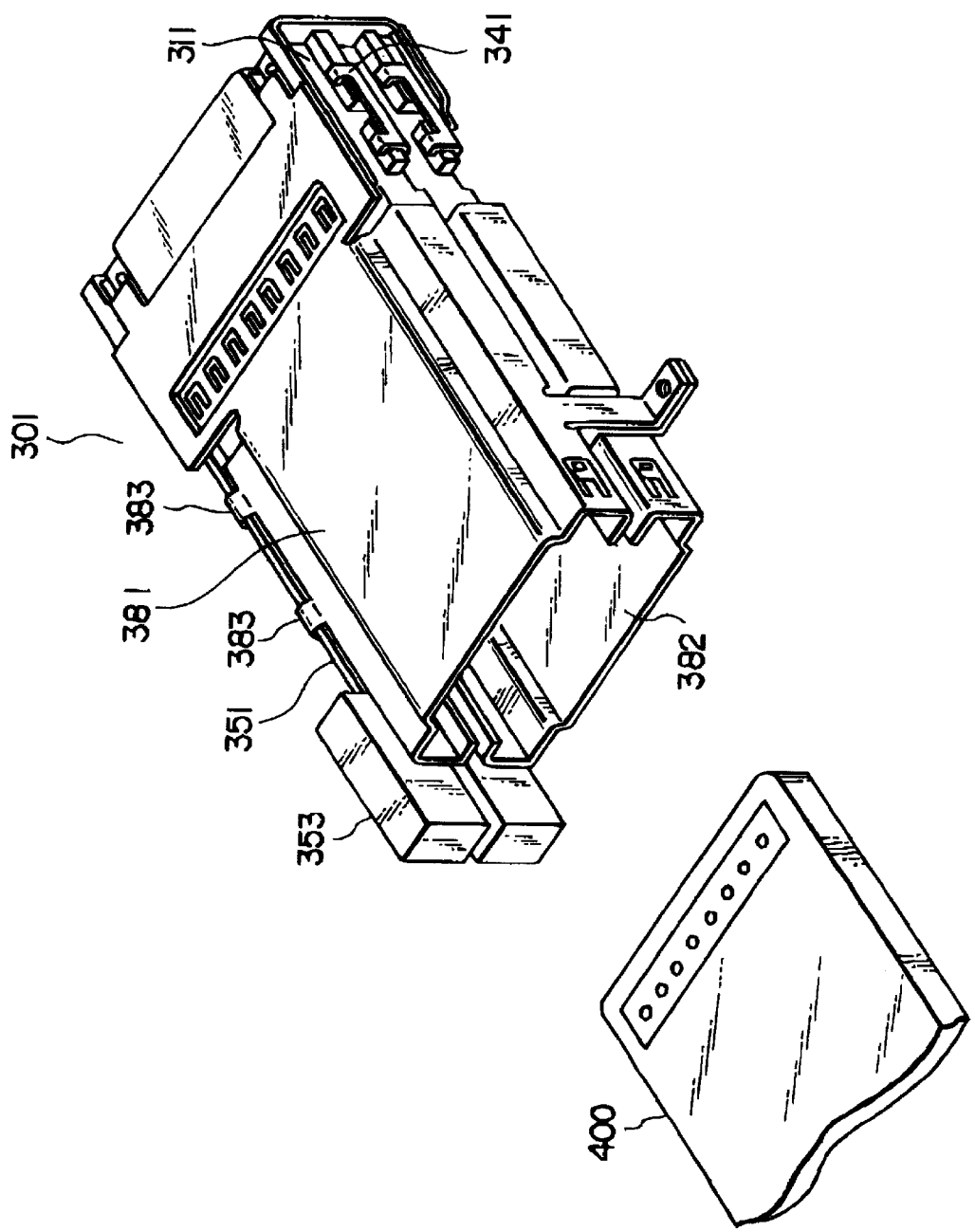
FIG. 1 is a perspective view of a conventional card connector.

Referring to FIG. 1, the conventional card connector 301 shown therein is of a double slot structure for receiving two cards simultaneously and is generally used in a notebook type personal computer or the like. The card connector 301 comprises two insulator bodies 311 having contacts and superposed on each other and two shield plates 381 and 382 of stainless steel attached to an upper side and a lower side of the two insulator bodies 311 superposed to define a space between the two shield plates. The space provides two upper and lower slots for receiving two cards 400 (one of which is shown) to be connected to contacts in upper and lower connector bodies 311, respectively.

The shield plates 381 and 382 are for protecting the cards 400 in the slots from the EMI.

In order to remove the cards in the upper and the lower slots, the card connector has upper and lower ejectors mounted on the upper insulator body and shield plate and the lower insulator body and shield plate. Each of the upper and the lower ejectors comprises an eject bar 351 slidably held by bent portions 383 of the shield plate (381 is only seen in the figure) to be slidable frontward and rearward. The eject bar 351 is made of metal such as stainless steel for a desired strength. The eject bar 351 is fixed with an eject button at its front end and is connected with a lever mechanism at its rear end. The lever mechanism is mounted on the insulator body 311 and includes a sliding plate 341.

The conventional card connector has problems as described in the preamble.

Now, an embodiment of the present invention will be described with reference to FIGS. 2 through 5.

Figure 2:
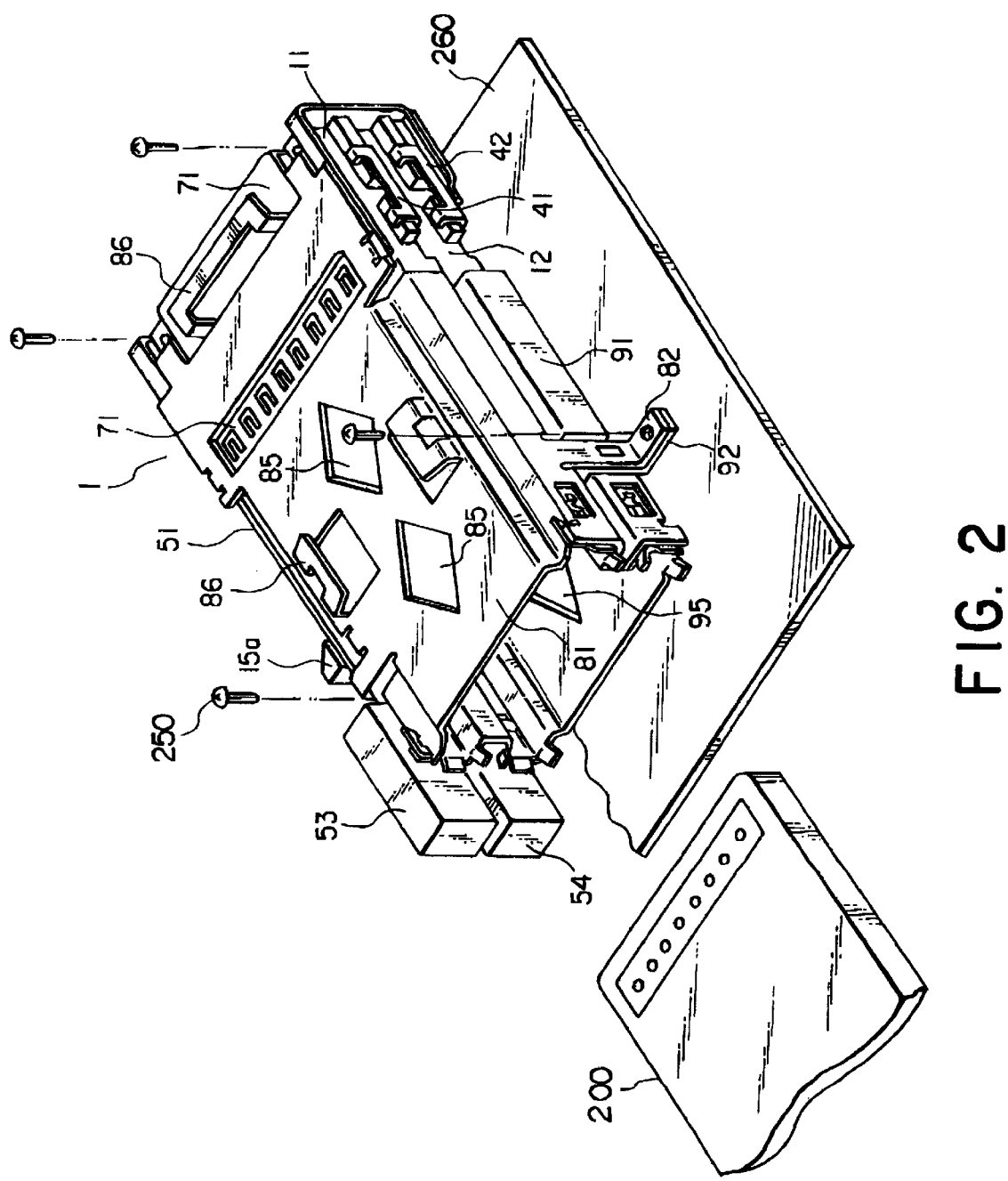
FIG. 2 is a perspective view of a card connector according to an embodiment of the present invention.

In FIG. 2, the card connector 1 has a double slot structure and is shown to be mounted on a printed circuit board 260 in, for example, a notebook type personal computer through screws 250. Under this condition, the card connector 1 is connected with or disconnected from a card 200.

Figure 3:
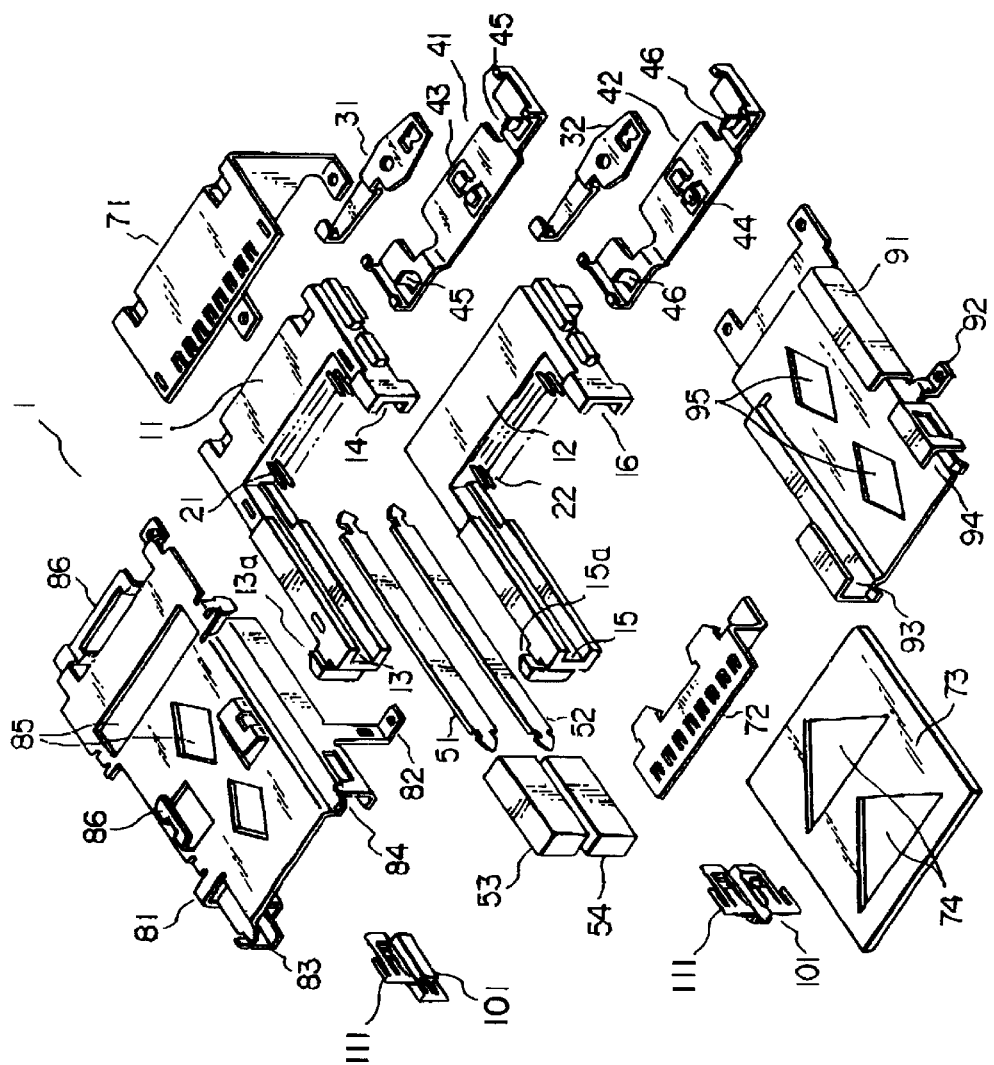
FIG. 3 is a perspective view of the card connector of FIG. 2 in a disassembled state.

Referring to FIG. 3 additionally, the card connector 1 comprises upper and lower insulator bodies 11 and 12 superposed on each other and upper and lower contact rows 21 and 22 installed in those insulator bodies 11 and 12. The insulator bodies 11 and 12 are formed in an approximately U-shaped form but having long and short arms. Further, the insulator bodies 11 and 12 have guide grooves 13, 14, 15, and 16 in the long and short arms for guiding the card 200 inserted into the two slots of the card connector 1. The guide grooves 13 and 15 are formed in the long arms and the guide grooves 14 and 16 are formed in the short arms.

The upper and the lower insulator bodies 11 and 12 have holding portions 13a and 15a projecting from outsides of their longer arms for slidably holding eject bars 51 and 52.

Rotary levers 31 and 32 are pivotably supported on pivots (not shown) formed on the insulator bodies 11 and 12.

Sliding plates 41 and 42 are slidably mounted on the insulator bodies 11 and 12. In detail, the sliding plates 41 and 42 have opposite side lugs bent and fitted onto the insulator bodies 11 and 12 so that the side lugs face opposite side surfaces of the insulator bodies. The sliding plates 41 and 42 are connected to the rotary levers 31 and 32 through lever connecting portions 43 and 44 formed on the sliding plates 41 and 42.

The sliding plates 41 and 42 are further formed with finger portions 45 and 46 which come into contact with forward end faces of cards 200 inserted in the upper and the lower slots. Therefore, the sliding plates 41 and 42 move rearward and frontward in response to operations for connecting and disconnecting the cards for the card connector 1.

The eject bars 51 and 52 support eject buttons 53 and 54 at their front ends, respectively, and are connected with the rotary levers 31 and 32 at their rearward ends, respectively.

Therefore, when the cards 200 are inserted into the upper and the lower slots of the card connector 1, the forward end faces of the cards 200 push the finger portions 45 and 46 of the sliding plates 41 and 42. As a result, the sliding plates 41 and 42 move rearward together with the cards 200. Since the lever connecting portions 43 and 44 are connected to the rotary levers 31 and 32, the rotary levers 31 and 32 rotate about the pivots on the insulator bodies 11 and 12. The rotation of the rotary levers 31 and 32 push the eject bars 51 and 52 frontward.

To disconnect cards 200 from the card connector 1, the eject buttons 53 and 54 are pressed rearward. As a result, the eject bars 51 and 52 are pressed so that the rotary levers 31 and 32 are rotated in the opposite direction, thus the sliding plates 41 and 42 being moved frontward. Therefore, the finger portions 45 and 46 push the cards 200 to disconnect from the card connector 1.

Ground plates 71 and 72 and shield plates 81 and 91 are made of aluminum alloy and are mounted on the insulator bodies 11 and 12. A separator 73 of an aluminum alloy is also disposed between the insulator bodies 11 and 12 to partition the upper slot from the lower slot. The separator 73 has ventilation holes 74.

The shield plates 81 and 91 are produced by pressing an aluminum alloy plate by a press and have guide grooves 83, 84, 93, and 94 at both sides of the shield plates for guiding the cards 200. The guide grooves 83 and 93 are shorter than the guide grooves 84 and 94, in correspondence to guide grooves 13 and 15 which are longer than the guide grooves 14 and 16 of the insulator bodies 11 and 12.

The shield plates 81 and 91 have ventilation holes 85 and 95 and fins 86 for dissipating heat produced from cards 200 operating. The ventilation holes 85 and 95 allow to flow therethrough by convection of air produced by a blower provided in the personal computer so that the heat is dissipated. The fins 86 come in contact with metallic parts such as a keyboard back plate of the personal computer to dissipate the heat produced by the cards 200 to the keyboard back plate through the fins.

Figure 4:
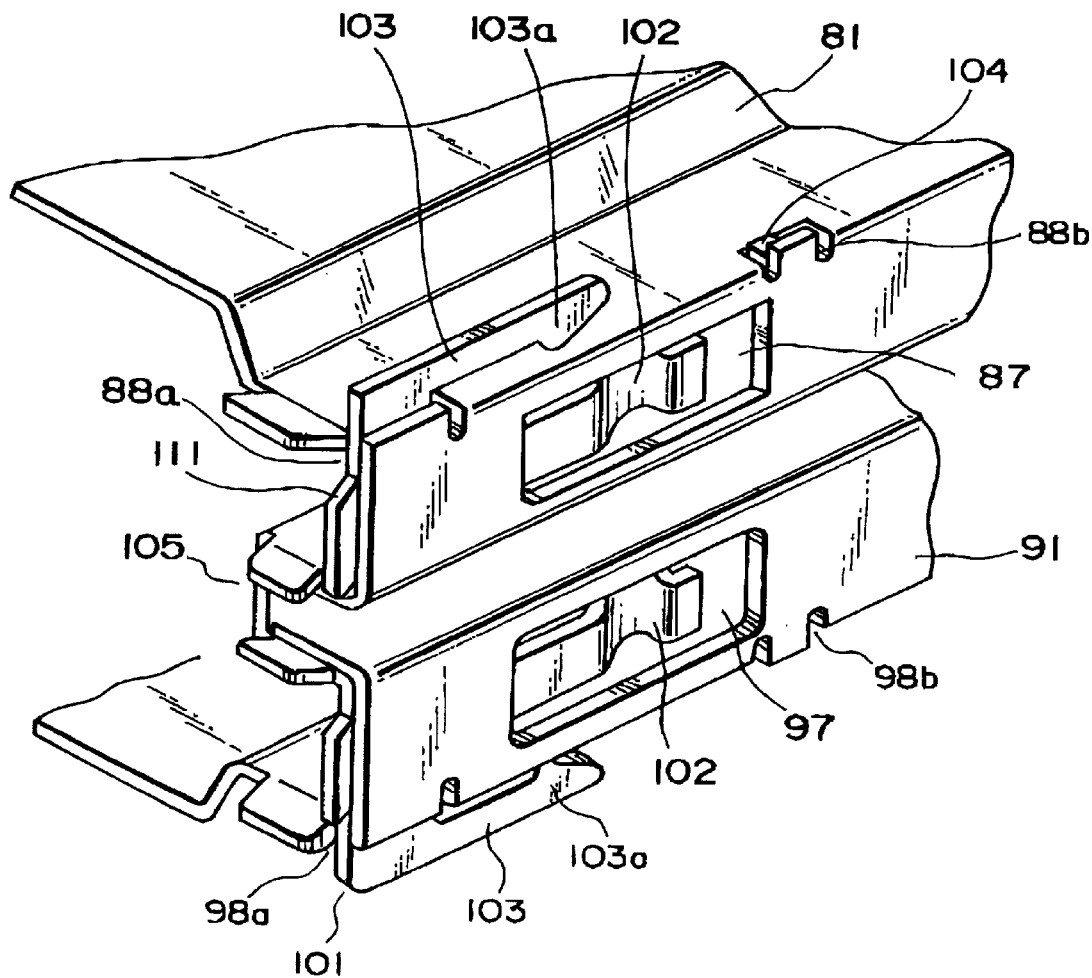
FIG. 4 is an enlarged perspective view of a front portion of the card connector of FIG. 3 showing a state in which grounding terminals are attached to the card connector.
Figure 5:
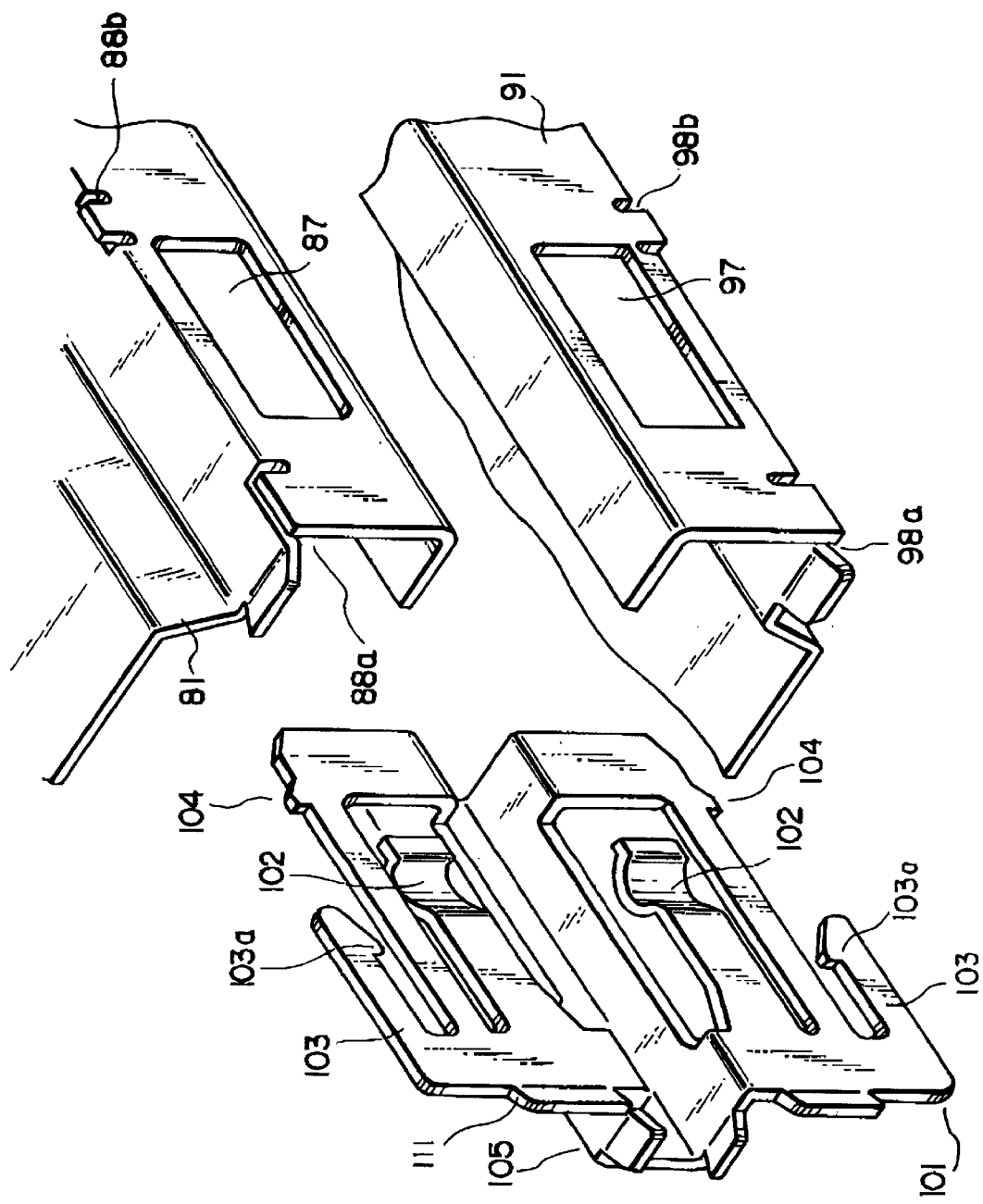
FIG. 5 is a view similar to FIG. 4 but showing another state in which the grounding terminals are not yet attached to the card connector.

Referring to FIGS. 4 and 5, the shield plates 81 and 91 have window portions 87 and 97 adjacent the front end portions and in a bottom side surface of the guide grooves 83, 84, 93 and 94 for the card 200, and also have slit portions 88a, 88b, 98a and 98b at the front end portions of defining bottom corners of the guide grooves.

The window portions 87 and 97 and slit portions 88a, 88b, 98a and 98b are for fitting grounding terminals 101 and 111 to the shield plates 81 and 91.

The grounding terminals 101 and 111, individually, have contacts 102, spring portions 103, protrusions 104 and bent portions 105. These grounding terminals 101 and 111 are attached to the shield plates 81 and 91 so that the contacts 102 fit into the window portions 87 and 97, the spring portions 103 fit into the slit portions 88a and 98a, and the protrusions 104 fit into the slit portions 88b and 98b, respectively. At this time, forward ends 103a of the spring portions 103 come into contact with the shield plates 81 and 91. Therefore, grounding terminals 101 and 111 are reliably and electrically connected to the shield plates 81 and 91, and thus, the shield plates 81 and 91 are electrically connected to the printed circuit board through screws inserted in screw holes 82 and 92 (see FIG. 2) of the shield plates 81 and 91.

The card connector 1 of the present invention is reduced in weight by the use of the shield plates 81 and 91 of aluminum alloy, because the specific gravity of the aluminum alloy is about ⅓ relative to that of the conventional stainless steel.

Further, the aluminum alloy shield plate of the present invention has heat conductivity higher than the conventional stainless-steel shield plate. Heat produced in the card 200 can be expelled by the ventilation holes 85 and 95 and fins 86.

In the card connector of this invention, the metallic eject bars 51 and 52 are slidable through the holding portions 13a and 15a of the plastic resin. Accordingly, the feeling of operating the eject bars 51 and 52 is improved in comparison with the conventional card connector where the metallic eject bar is held by metallic bent portions of the shield plates.

Further, the card 200 is guided almost by the metallic guide grooves 84 and 94 at a side opposite to another side holding the eject bar. Therefore, the card connector can be small-sized in comparison with a conventional structure where both sides of the card are guided by opposite guide grooves formed in the plastic resin body, because the metal is larger in strength than the plastic resin.

This invention has been described in connection with an embodiment of the two-slot type, but it will be understood that this invention can readily apply to a card connector of a single-slot type, or other types of three or more slots.

As apparent from the above description, this invention can provide the following advantages:

(1) Because the shield plate is formed of aluminum alloy, heat conductivity of the shield plate is improved as compared with the conventional stainless-steel shield plate. Further, because the shield plate has the ventilation holes and dissipating fins, heat produced in the card can be expelled readily.

(2) Because the shield plate is formed of aluminum alloy, the weight thereof is reduced as compared with the conventional stainless-steel shield plate, so that use of the card connector of this invention can improve portability of a notebook type personal computer.

(3) Because the eject bar is slidably held by a holding portion formed by molding plastic resin together with the insulator body of the card connector, the feeling of operating the eject bar is improved.

What is claimed is:

1. A card connector for receiving a card having a mating connector, which comprises:

an insulator body supporting contacts to be connected and disconnected with said mating connector, said insulator body having two arms frontwardly extending in parallel with each other to form a generally U-shape with a space left between said two arms; and two electromagnetic shield plates fixed to said insulator body and said arms to cover said space, said two electromagnetic shield plates defining upper and lower walls of a slot for receiving a card there between, said shield plates being made of aluminum alloy, said shield plates having ventilation holes and heat dissipating fins, and said shield plates protecting said card in said receiving slot from ambient electromagnetic noise and interference.

2. A card connector as claimed in claim 1, further comprising an ejector including an eject bar for ejecting the card in said card receiving slot, wherein a first one of said arms is provided with an eject bar holding portion for slidably holding said eject bar so that said eject bar can be slid along said first arm frontward and rearward.

3. A card connector as claimed in claim 2, wherein said first arm is longer than the other one of said two arms as a second arm.

4. A card connector as claimed in claim 3, wherein said first and said second arms are provided with first and second guide grooves in inner side surfaces thereof, respectively, for receiving opposite sides of said card to guide frontward and rearward movement of said card in said card receiving slot.

5. A card connector as claimed in claim 4, wherein said second guide groove is shorter than said first guide groove, and said shield plates define a card guiding groove connecting with said second guide groove.

6. A card connector as claimed in claim 1, having a double-slot structure, wherein said insulator body comprises two like pieces having said generally U-shape superposed on each other, and a separator made of aluminum alloy is disposed between said two pieces, said separator having ventilation holes.

* * * * *